United States Patent [19]

Shimamura et al.

[11] Patent Number: 4,755,738

[45] Date of Patent: Jul. 5, 1988

[54] REACTIVE POWER COMPENSATION APPARATUS

[75] Inventors: Takeo Shimamura; Hiroshi Uchino; Ryoichi Kurosawa, all of Tokyo, Japan

[73] Assignee: Kabushiki Kaisha Toshiba, Kawasaki, Japan

[21] Appl. No.: 91,666

[22] Filed: Sep. 1, 1987

[30] Foreign Application Priority Data

Sep. 11, 1986 [JP] Japan .................................. 61-212553
Sep. 11, 1986 [JP] Japan .................................. 61-212554

[51] Int. Cl.$^4$ .............................................. G05F 1/70
[52] U.S. Cl. ..................................... 323/210; 318/438
[58] Field of Search ...................... 323/209, 210, 211; 318/438

[56] References Cited

U.S. PATENT DOCUMENTS

| | | | |
|---|---|---|---|
| 3,968,422 | 7/1976 | Waldmann | 323/210 |
| 4,234,842 | 11/1980 | Brennen et al. | 323/210 |
| 4,275,346 | 6/1981 | Kelley | 323/210 |
| 4,652,989 | 3/1987 | Kurosawa et al. | 363/161 |
| 4,698,581 | 10/1987 | Shimamura et al. | 323/210 |

OTHER PUBLICATIONS

The Transaction of the Institute of Electrical Engineers of Japan, vol. 103-B, No. 7, Jul. 1983, Hirotumi Akagi et al.
Denki Gakkai, Denryoku Gijutsu Kenkyukai, Jul. 1985.

*Primary Examiner*—William H. Beha, Jr.
*Attorney, Agent, or Firm*—Oblon, Fisher, Spivak, McClelland & Maier

[57] ABSTRACT

A reactive power compensation apparatus for compensating for voltage fluctuation of an AC power supply system includes a first arithmetic circuit for synthesizing a positive-phase fundamental wave voltage signal from voltages of the AC power supply system, a second arithmetic circuit for synthesizing negative-phase voltage signals from the voltages of the AC power supply system, a third arithmetic circuit, coupled to the first and second arithmetic circuits, for synthesizing current instructions from the positive-phase fundamental wave voltage and the negative-phase voltage signals, and a circuit, coupled to the third arithmetic circuit, for generating a reactive power corresponding to the current instructions.

10 Claims, 7 Drawing Sheets

REACTIVE POWER COMPENSATION APPARATUS

BACKGROUND OF THE INVENTION

The present invention relates to a reactive power compensation apparatus and, more particularly, to an effective reactive power compensation apparatus which suppresses voltage fluctuation and unbalance in an AC power supply system so as to stabilize the power supply system.

In recent years, a load requiring a single-phase power such as an AC-powered electric train is coupled to a power supply system, and this causes a voltage unbalance of the power supply system due to the influences of an unbalanced current and an impedance of the power supply system. Voltage fluctuation upon a change in reactive power is also a problem. For this reason, the power supply system is equipped with a reactive power compensation apparatus to compensate for the reactive power of the power supply system and suppress the voltage fluctuation. Furthermore, the unbalanced current of the power supply system is compensated for to remove an unbalanced component of the voltage.

A power supply system equipped with a reactive power compensation apparatus is described in detail in an article entitled "Simulator Test for System Stabilization by Static Var Compensator (SVC) using Digital Controller" announced in *Denki Gakkai, Denryoku Gijutsu Kenkyukai* in July, 1985. The basic arrangement of this system is as shown in FIG. 1.

Figure 1:
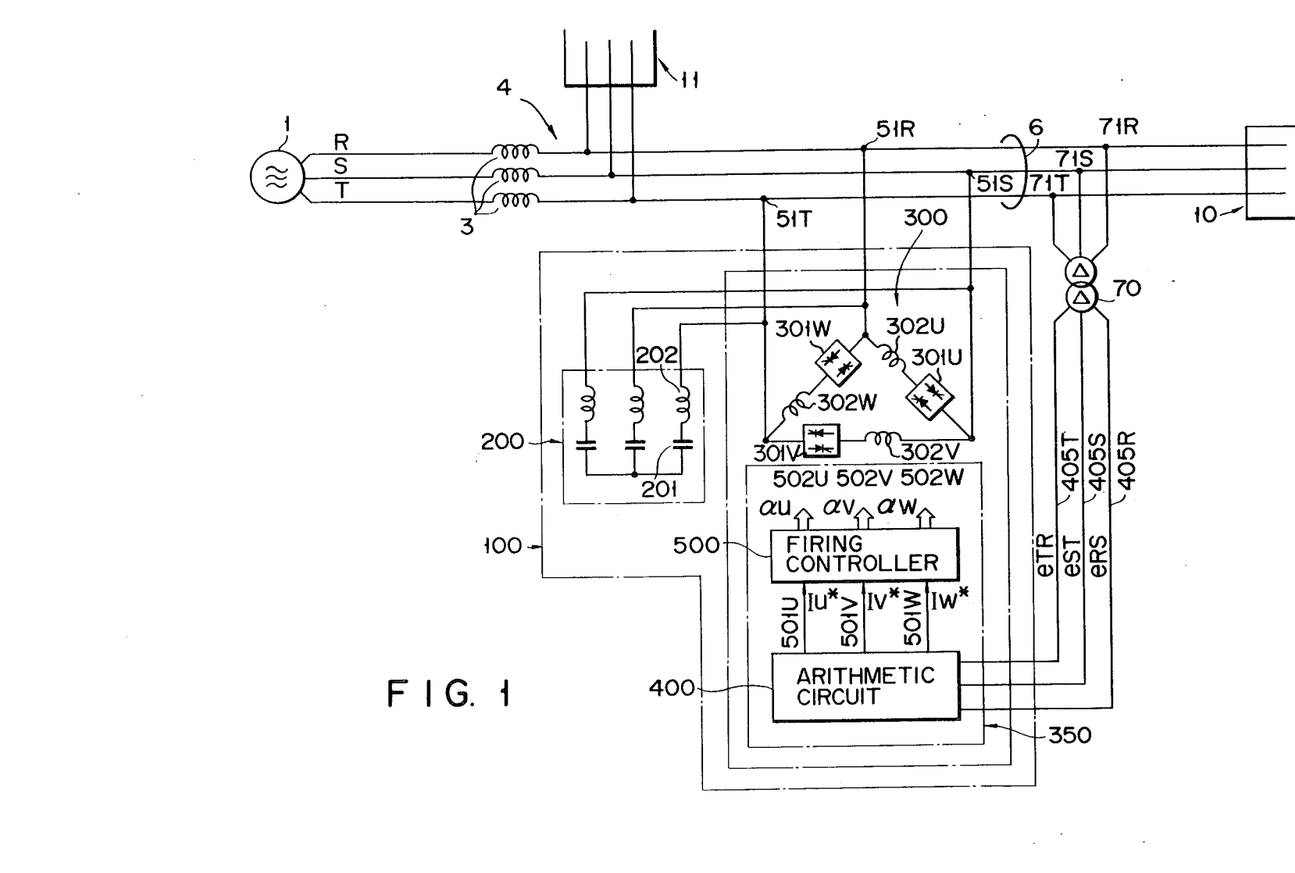
FIG. 1 is a block diagram showing a principal circuit of a reactive power compensation apparatus to which the present invention can be applied.

Referring to FIG. 1, reference numerals 10 and 11 denote power supply buses of branch lines coupled to the load such as an AC-powered electric train; 4, an AC power supply system; and 100, a reactive power compensation apparatus, which comprises reactor part 300 and phase-advanced capacitor part 200. Reactor part 300 comprises reactors 302U to 302W, cross-coupled thyristors 301U to 301W connected in series therewith, potential transformer 70, and control circuit 350 for thyristors 301U to 301W. Firing angles of thyristors 301U to 301W are adjusted by circuit 350 in accordance with a voltage detection value of power supply bus 6, thereby controlling current IR of reactor part 300. Note that reference numeral 3 denotes an impedance of a triple-phase AC power supply system; and 1, a triple-phase AC power supply system for trunk lines.

Figure 2:
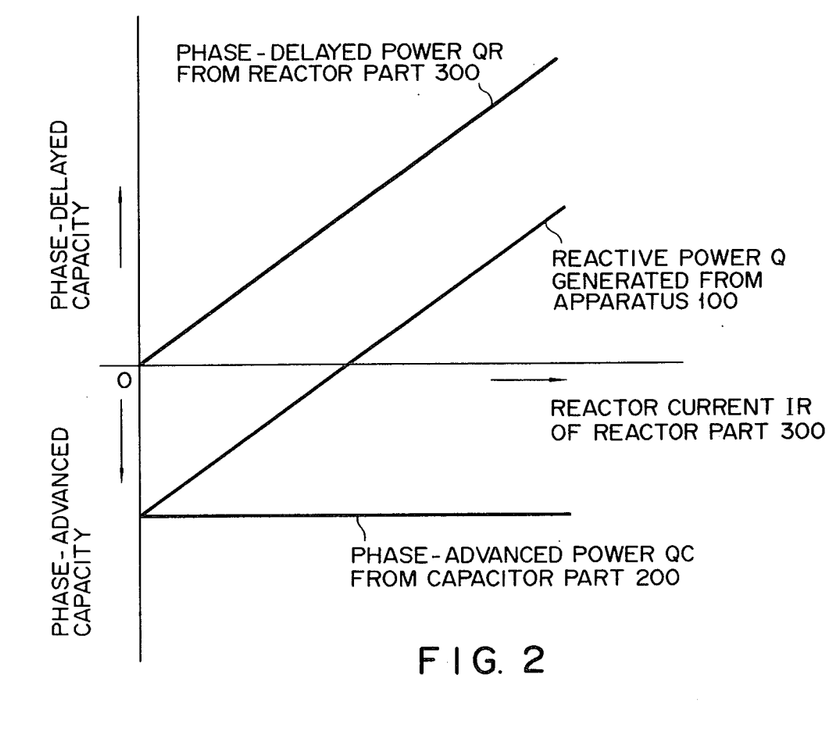
FIG. 2 is a graph for explaining the principle of the operation of the reactive power compensation apparatus.

A power capacity (phase-delayed capacity) of reactor part 300 of apparatus 100 is normally set to be twice a power capacity (phase-advanced capacity) of phase-advanced capacitor part 200. When reactor current IR is changed from zero to maximum, power Q generated from apparatus 100 can be smoothly changed from an advanced-phase to a delayed-phase, as shown in FIG. 2.

In the power supply system with the above arrangement, if a reactive current (or reactive power) of bus 6 is changed, a voltage of bus 6 fluctuates upon a change in current (power) and impedance 3. When an unbalanced current generated by a single-phase load such as an AC-powered electric train flows through bus 6, the voltage of bus 6 is unbalanced due to the influence of the unbalanced current and impedance 3. The reactive power compensation apparatus is adopted to suppress and compensate for voltage fluctuation and unbalance. However, the performance of the apparatus is determined by the detection precision of the voltage fluctuation and unbalance.

The conventional reactive power compensation apparatus has the following drawbacks. More specifically, the voltage fluctuation of AC bus 6 includes a component caused by a change in positive-phase current (positive-phase voltage fluctuation) and an unbalanced component of a voltage caused by a negative-phase current (negative-phase voltage fluctuation). In the conventional voltage detection technique, the positive-and negative-phase voltage fluctuation cannot be distinctly separated. The voltage fluctuation of bus 6 is regarded simply as a fluctuation component arbitrarily including positive- and negative-phase voltage fluctuations, and the reactive power compensation apparatus is controlled based on this. For this reason, in the conventional reactive power compensation apparatus, an object to be compensated cannot be theoretically identified, that is, it cannot be identified whether positive-phase voltage fluctuation (in particular, fluctuation caused by a positive-phase reactive current) or negative-phase voltage fluctuation, i.e., an unbalanced component of a voltage, is to be controlled. Therefore, high-precision control cannot be achieved.

A strong demand has arisen for the improvement of power quality in an AC power system and hence for a reactive power compensation apparatus for stabilizing a power system, capable of higher-precision control. In order to meet such a demand, development of a reactive power compensation apparatus comprising a high-precision voltage detection technique (positive and negative-phase voltage fluctuation detection) based on a novel control principle has received a great deal of attention.

SUMMARY OF THE INVENTION

The present invention has been made in consideration of the above situation, and has as its object to provide a reactive power compensation apparatus for compensating for an unbalanced voltage, wherein voltage fluctuation of a power supply system is separated and detected to be positive and negative components to identify objects to be compensated, thereby realizing high-precision voltage compensation control.

In order to achieve the above object, a reactive power compensation apparatus for compensating for voltage fluctuation of an AC power supply system includes: a first arithmetic circuit (403, 406, 408, 413) for synthesizing a positive-phase fundamental wave voltage signal (P1PD) from voltages (eRS, eST, eTR) of the AC power supply system; a second arithmetic circuit (403, 406, 410, 414, 415) for synthesizing negative-phase voltage signals (P1ND, Q1ND) from the voltages (eRS, eST, eTR) of the AC power supply system; a third arithmetic circuit (420A), coupled to the first and second arithmetic circuits (413–415), for synthesizing current instructions (IU*, IV*, IW*) from the positive-phase fundamental wave voltage (P1PD) and the negative-phase voltage signals (P1ND, Q1ND); and a circuit (200, 300, 500), coupled to the third arithmetic circuit (420A), for generating a reactive power corresponding to the current instructions (IU*, IV*, IW*).

DETAILED DESCRIPTION OF THE PREFERRED EMBODIMENTS

The principle of the present invention will be described with reference to FIGS. 3 and 4. System voltages (eRS, eST, eTR) are detected, and are supplied to elements 403 and 406 in FIG. 3. Element 406 generates unit-dual-phase voltage signals (e1d*, e1g*) in synchronism with the system voltages. Element 403 converts triple-phase voltage signals into dual-phase signals (e1ds, e1gs). The signals from elements 403 and 406 are supplied to elements 408 and 410 to calculate instantaneous power signals (P1P, P1N, Q1N). Elements 413, 414, and 415 extract DC components (P1PD: a positive-phase fundamental wave voltage signal, P1ND, Q1ND: first-phase negative-phase voltage signals) from signals P1P, P1N, and Q1N. These DC components P1PD, P1ND, and Q1ND are supplied to element 420A.

Figure 4:
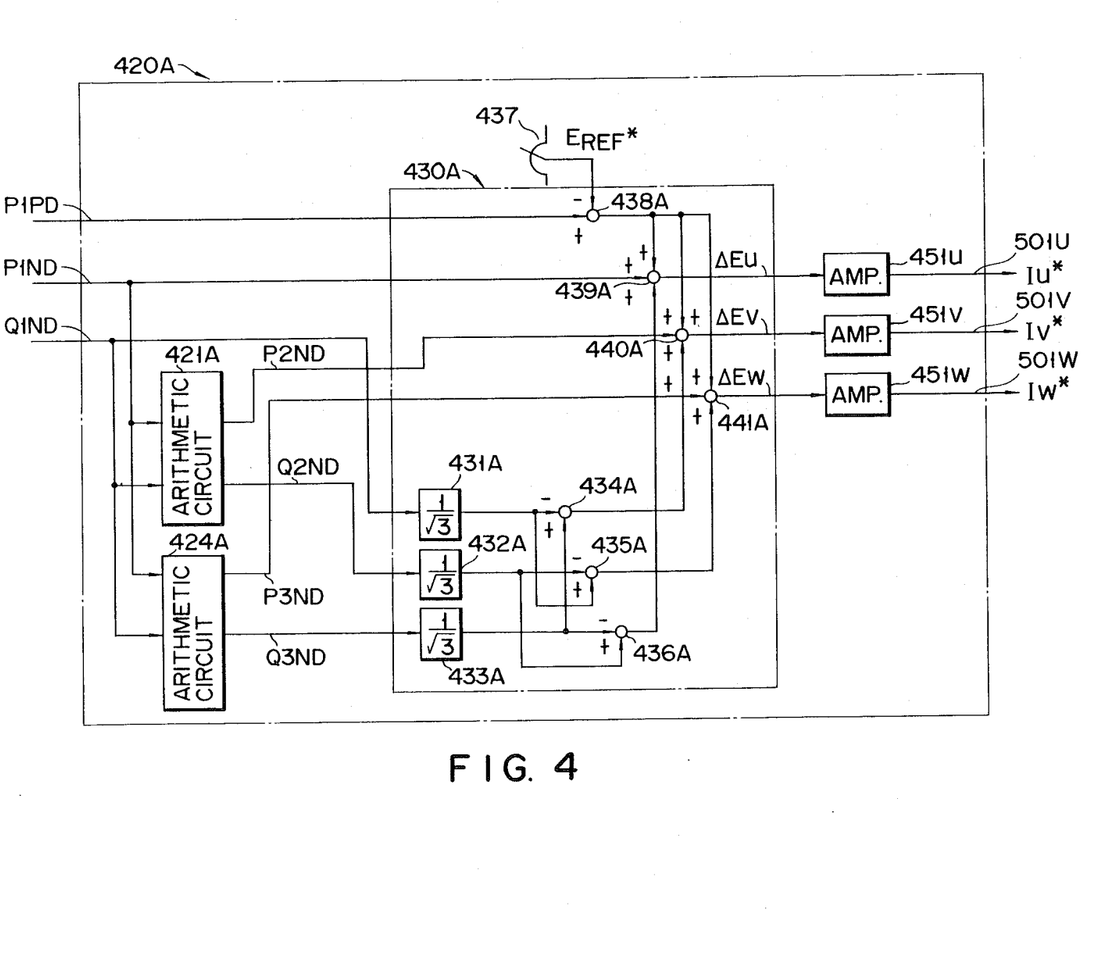
FIG. 4 is a block diagram showing an arrangement of a distributor (420A) in the control circuit shown in FIG. 3.

FIG. 4 shows the content of element 420A. Elements 421A and 424A shown in FIG. 4 respectively calculate second- and third-phase negative-phase voltages (P2ND, Q2ND, P3ND, Q3ND) using signals P1ND and Q1ND. Element 437 sets a voltage value of a power supply system to be retained. Element 430A calculates voltage deviation signals ΔEU, ΔEV, and ΔEW using signals P1PD, P1ND, Q1ND, P2ND, Q2ND, P3ND, and Q3ND. Amplifiers 451U, 451V, and 451W amplify signals ΔEU, ΔEV, and ΔEW to obtain current instructions IU*, IV*, and IW* of reactors. The reactive power compensation apparatus is controlled based on these instructions.

With the above control circuit, information of the system voltages can be separated and detected in the forms of a positive component (P1PD) and of negative components (P1ND, Q1ND, P2ND, Q2ND, P3ND, and Q3ND). The reactive power compensation apparatus is controlled by the positive-/negative-phase component signals. Therefore, the objects to be compensated can be identified, and a high-precision apparatus can be realized.

A power supply system comprising a reactive power compensation apparatus of the present invention can be the same as that shown in FIG. 1 (the triple-phase system will be described hereinafter for the sake of simplicity). Therefore, a description of elements referred to in the description of FIG. 1 will be omitted.

Referring to FIG. 1, potential transformer 70 detects line voltages (eRS, eST, eTR) of AC bus 6 as an object to be compensated, and supplies the detected voltages to control circuit 350. Reactor part 300 is normally delta-connected, and levels of currents flowing through reactors 302U to 302W are adjusted by adjusting firing angles of thyristors 301U to 301W. The reactor currents have a distorted waveform including a harmonic wave component in addition to a fundamental wave.

Arithmetic circuit 400, as the characteristic feature of the present invention, receives voltage signals eRS, eST, and eTR to perform various arithmetic operations, and outputs current instructions IU*, IV*, and IW* of DC values for instructing fundamental wave currents to be flowed from reactor part 300.

Firing controller 500 is operated in response to current instructions IU*, IV*, and IW*, and firing-controls thyristors 301U, 301V, and 301W to cause them to flow currents instructed by instructions IU*, IV*, and IW* through reactors 302U, 302V, and 302W.

Figure 3:
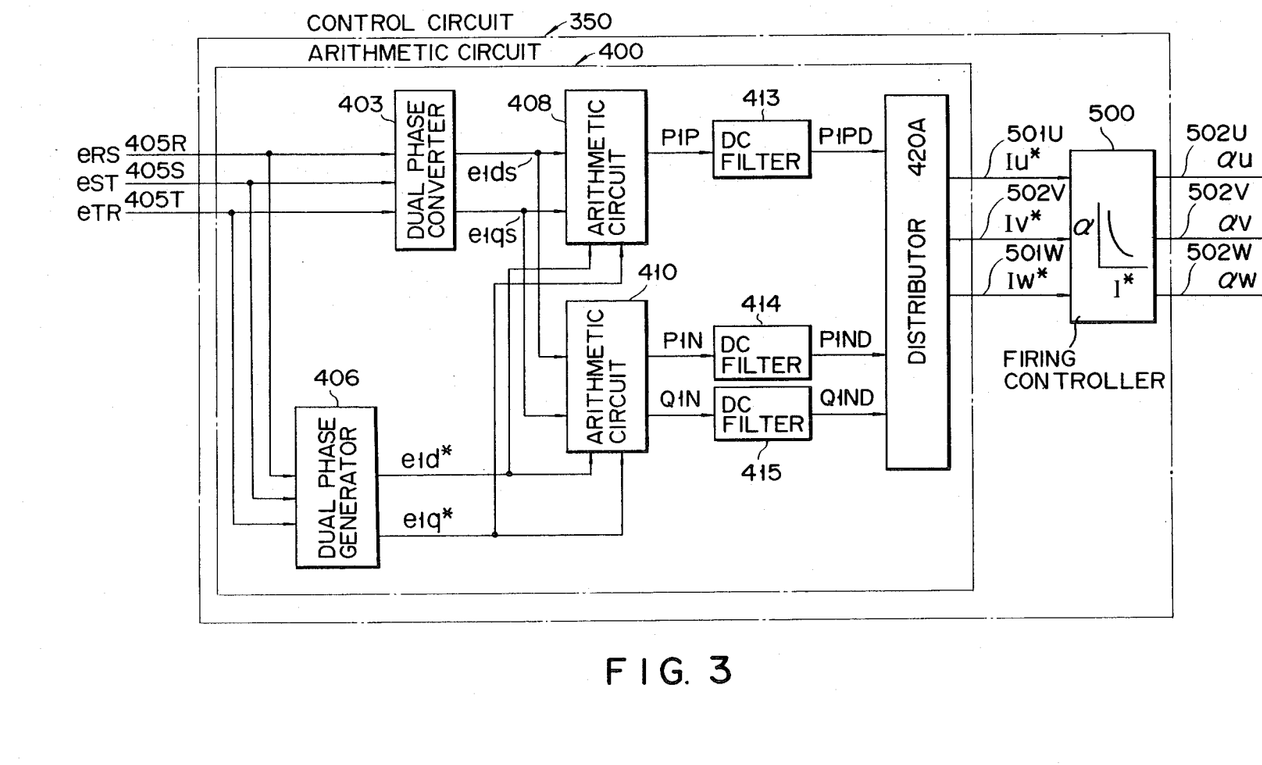
FIG. 3 is a block diagram showing a control circuit of the reactive power compensation apparatus according to an embodiment of the present invention.

A combination of arithmetic circuit 400 and firing controller 500 is called control circuit 350, and FIG. 3 shows the detailed circuit arrangement thereof.

The principal part of the present invention will now be described with reference to FIGS. 3 and 4.

Referring to FIG. 3, triple-phase AC bus voltage signals eRS, eST, and eTR in FIG. 1 are input to dual phase converter 403 and dual phase signal generator 406. Converter 403 converts voltage signals eRS, eST, and eTR into dual-phase voltage signals e1ds and e1qs using equations (1) below:

$$\left. \begin{array}{l} e1ds = (\sqrt{2/3})\{eRS - (eST + eTR)/2\} \\ e1qs = (\sqrt{2/3})\{(\sqrt{3/2})(eST - eTR)\} \end{array} \right\} \quad (1)$$

Generator 406 is constituted by a phase-locked loop circuit, and receives voltage signals eRS, eST, and eTR. If the first phase is represented by an R phase, the second phase is represented by an S phase, and the third phase is represented by a T phase, generator 406 outputs unit-sine signal e1d* synchronous with line voltage eRS across the first and second phases, and unit-sine signal e1q* delayed by 90 degrees therefrom. Signals e1d* and e1q* can be expressed by equations (2):

$$\left. \begin{array}{l} e1d* = \cos\theta RS \\ e1q* = \sin\theta RS \end{array} \right\} \quad (2)$$

Arithmetic circuit 408 receives signals e1ds and e1qs and signals e1d* and e1q*, and yields signal P1P using equation (3):

$$P1P = e1d* \cdot e1ds + e1q* \cdot e1qs \quad (3)$$

When system voltages eRS, eST, and eTR include positive-/negative-phase components, P1P is a pulse current including a DC component and an AC component which is oscillated with a magnitude twice that of a fundamental wave. DC filter 413 outputs the DC component of signal P1P as signal P1PD. More specifically, P1PD represents a positive-phase fundamental wave voltage included in system voltages eRS, eST, and eTR.

Arithmetic circuit 410 receives signals e1ds and e1qs and signals e1d* and e1q*, and yields signals Q1N and P1N using equations (4):

$$Q1N = eId^* \cdot eIqs - (-eIq^*) \cdot eIds \brace P1N = eId^* \cdot eIds + (-eIq^*) \cdot eIqs \quad (4)$$

When system voltages eRS, eST, and eTR include positive-/negative-phase components, P1N and Q1N are pulse current signals. Signals P1N and Q1N are respectively filtered through DC filters P1N and Q1N, thereby detecting DC component signals P1ND and Q1ND. Resultant signals P1ND and Q1ND respectively represent voltages of respective components when negative-phase voltage included in line voltage eRS across the first and second phases is separated into a component (P1ND) in phase with the positive-phase fundamental wave component of the line voltage across the first and second phases and a component (Q1ND) having a 90-degree phase difference therefrom. P1ND is called a first-phase in-phase negative-phase voltage signal, and Q1ND is called a first-phase 90-degree-out-of-phase negative-phase voltage signal.

Distributor 420A performs arithmetic operations in response to signals P1PD, P1ND, and Q1ND, and outputs current instructions IU*, IV*, and IW* for instructing currents to be flowed from reactor part 300 shown in FIG. 1. FIG. 4 shows the detailed arrangement of distributor 420A.

Firing controller 500 is operated in response to current instructions IU*, IV*, and IW*, and firing-controls thyristors 301U, 301V, and 301W to cause reactor part 300 to flow currents (fundamental waves) instructed by IU*, IV*, and IW*.

Distributor 420A will now be described with reference to FIG. 4. The signals indicated by the same reference symbols in FIGS. 3 and 4 are connected accordingly. Referring to FIG. 4, arithmetic circuits 421A and 424A receive first-phase 90-degree-out-of-phase negative-phase voltage signal Q1ND and first-phase in-phase negative phase voltage signal P1ND, and output second-phase 90-degree-out-of-phase negative-phase voltage signal Q2ND, second-phase in-phase negative-phase voltage signal P2ND, third-phase 90-degree-out-of-phase negative-phase voltage signal Q3ND, and third-phase in-phase negative-phase voltage signal P3ND through arithmetic operations represented by equations (5) and (6).

$$Q2ND = P1ND \cdot \sin(2\pi/3) + Q1ND \cdot \cos(2\pi/3) \brace P2ND = P1ND \cdot \cos(2\pi/3) - Q1ND \cdot \sin(2\pi/3) \quad (5)$$

$$Q3ND = -P1ND \cdot \sin(2\pi/3) + Q1ND \cdot \cos(2\pi/3) \brace P3ND = P1ND \cdot \cos(2\pi/3) + Q1ND \cdot \sin(2\pi/3) \quad (6)$$

P2ND and Q2ND represent an in-phase voltage component (P2ND) and a voltage component (Q2ND) having a 90-degree phase difference therefrom obtained when the negative-phase component of line voltage eST across the second and third phases is decomposed into a component in phase with the positive-phase fundamental wave component of line voltage eST and a component having a 90-degree phase difference therefrom.

Similarly, P3ND and Q3ND represent an in-phase voltage component (P3ND) and a voltage component (Q3ND) having a 90-degree phase difference therefrom obtained when the negative-phase component of line voltage eTR across the third and first phases is decomposed into a component in phase with the positive-phase fundamental wave component of line voltage eTR and a component having a 90-degree phase difference therefrom.

Setting device 437 outputs voltage setting signal EREF* for instructing a voltage to be maintained on AC bus 6 shown in FIG. 1.

Distributor 430A performs arithmetic operations represented by equations (7) presented below based on positive-phase fundamental wave voltage signal P1PD; first-, second-, and third-phase 90-degree-out-of-phase negative-phase voltage signals Q1ND, Q2ND, and Q3ND and in-phase negative-phase voltage signals P1ND, P2ND, and P3ND; and voltage setting signal EREF*, detected from the AC bus voltages; and outputs voltage deviation signals ΔEU, ΔEV, and ΔEW.

Amplifiers 451U, 451V, and 451W, constituted by proportional integrators and the like, amplify deviations ΔEU, ΔEV, and ΔEW, and output amplified results as signals IU*, IV*, and IW*. Signals IU*, IV*, and IW* are first-phase current instruction IU* for instructing a current to be flowed through first-phase reactor 302U of reactor part 300 shown in FIG. 1, second-phase current instruction IV* for reactor 302V, and third-phase current instruction IW* for reactor 302W.

Distributor 430A is constituted by the following elements. More specifically, coefficient multipliers 431A, 432A, and 433A multiply input signals by $1\sqrt{3}$, and output the products. Adders 434A, 435A, and 436A add the outputs from multipliers 431A, 432A, and 433A in polarities shown in FIG. 4.

The outputs from adders 434A, 435A, and 436A correspond to the arithmetic operation in the third terms of equations (7). Adder 438A adds setting signal EREF* to signal P1PD in the polarities shown in FIG. 4. More specifically, the output from adder 438A corresponds to the first term of each equation (7). Adders 439A, 440A, and 441A add signals P1ND, P2ND, P3ND, an output signal from adder 438A, and the output signals from coefficient multipliers 434A, 435A, and 436A in the polarities shown in FIG. 4, and respectively output ΔEU, ΔEV, and ΔEW in equations (7):

$$\begin{aligned} \Delta EU &= (-EREF^* + P1PD) + P1ND + \\ & \quad (1/\sqrt{3})(Q2ND - Q3ND) \\ \Delta EV &= (-EREF^* + P1PD) + P2ND + \\ & \quad (1/\sqrt{3})(Q3ND - Q1ND) \\ \Delta EW &= (-EREF^* + P1PD) + P3ND + \\ & \quad (1/\sqrt{3})(Q1ND - Q2ND) \end{aligned} \quad (7)$$

Signals IU*, IV*, and IW* obtained through the above arithmetic operations correspond to signals representing DC levels, each of which includes information associated with a positive-phase voltage (term P1PD) and information associated with a negative-phase voltage (terms (P1ND–P3ND) and (Q1ND–Q3ND)). Therefore, reactor part 300 shown in FIG. 1 can be controlled based on signals IU*, IV*, and IW*, so that a voltage fluctuation caused by a positive-phase reactive current generated in branch line power supply lines 10 and 11 shown in FIG. 1 and by bus impedance 3, and an unbalanced voltage of bus 6 caused by a negative-phase current generated in lines 10 and 11 and by bus impedance 3 can be desirably stabilized and balanced.

The above is a typical arrangement of the present invention.

Referring to FIG. 1, voltages of the AC bus are detected as signals eRS, eST, and eTR. In general, these voltages are unbalanced voltages including positive- and negative-phase components.

The voltages are first supplied to dual phase generator 406 shown in FIG. 3, so that dual-phase signals e1d* and e1q* are output based on equations (2). Dual phase generator 406 is adjusted to be responsive to only the positive-phase fundamental wave components of voltage signals eRS, eST, and eTR. Therefore, dual-phase signals include information associated with only a positive-phase fundamental wave of the voltage.

Voltage signals eRS, eST, and eTR are also input to dual phase converter 403, and are subjected to conversion represented by equations (1), thus obtaining dual-phase signals e1ds and e1qs. The arithmetic operation given by equation (3) is performed by arithmetic circuit 408 to obtain signal P1P. Signal P1P is filtered through DC filter 413 to extract DC signal P1PD therefrom. Extracted signal P1PD represents a positive-phase fundamental wave voltage included in system voltages eRS, eST, and eTR.

The arithmetic operations given by equations (4) are performed by arithmetic circuit 410 to obtain signals P1N and Q1N. Signals P1N and Q1N are filtered through DC filters 414 and 415, thereby extracting DC signals P1ND and Q1ND therefrom. Signals P1ND and Q1ND respectively represent voltages of respective components, i.e., an in-phase voltage component (P1ND) and a voltage component (Q1ND) having a 90-degree phase difference therefrom when the negative-phase voltage component included in line voltage eRS across the first and second phases is separated into a component in phase with the positive-phase fundamental wave component of the line voltage across the first and second phases and a component having a 90-degree phase difference therefrom. (Note that P1ND will be referred to as a first phase in-phase negative-phase voltage hereinafter; and Q1ND will be referred to as a first-phase 90-degree-out-of-phase negative-phase voltage.)

In distributor 420A shown in FIG. 4, the arithmetic operations represented by equations (5) and (6) are performed by arithmetic circuits 421A and 424A, thereby obtaining second-phase in-phase negative-phase voltage P2ND, second phase 90-degree-out-of-phase negative-phase voltage Q2ND, third-phase in-phase negative-phase voltage P3ND, and third-phase 90-degree-out-of-phase negative-phase voltage Q3ND.

Signal P1PD obtained as described above is a signal associated with only a positive-phase fundamental wave voltage included in system voltages eRS, eST, and eTR. More specifically, signal P1PD is a signal associated with only a component in phase with the positive-phase fundamental wave voltage. In various arithmetic operations associated with the positive-phase component of a voltage, e.g., in the conversion represented by equation (3), even if the arithmetic operation is performed for any phase, the same calculation can be determined. Therefore, the arithmetic operation for the positive-phase component need be performed only for a single phase.

Paying attention to signals P1ND and Q1ND, signals P2ND and Q2ND, and signals P3ND and Q3ND, these signals are associated with only negative-phase components included in system voltages eRS, eST, and eTR. That is, signals P1ND and Q1ND are associated with only the negative-phase component of voltage eRS, signals P2ND and Q2ND with that of voltage eST, and signals P3ND and Q3ND with that of voltage eTR. More specifically, in the case of P1ND and Q1ND, P1ND is associated with a voltage component in phase with the positive-phase fundamental wave component of the line voltage in the negative-phase component of voltage eRS, and Q1ND is associated with a voltage component having a 90-degree phase difference from the positive-phase fundamental wave voltage.

As described above, all the information of system voltages eRS, eST, and eTR are independently separated and detected in the form of signals P1PD, P1ND, P2ND, P3ND, Q1ND, Q2ND, and Q3ND.

The signals obtained in this manner are subjected to arithmetic operations in accordance with equations (7) in distributor 430A shown in FIG. 4 to obtain voltage deviation signals ΔEU, ΔEV, and ΔEW. The resultant signals are amplified to obtain current instructions IU*, IV*, and IW*.

When the current of reactor part 300 shown in FIG. 1 is controlled based on current instructions IU*, IV*, and IW*, reactive power compensation apparatus 100 is operated as follows.

For example, if a negative current flows through the systems of bus 6 to cause an unbalanced voltage, this is detected by control circuit 350 (in the form of signals P1ND, Q1ND, P2ND, Q2ND, P3ND, and Q3ND shown in FIG. 4). Based on these signals, reactor part 300 generates a compensation negative-phase current to cancel the unbalanced voltage (to have a phase opposite to that of a negative phase current supplied from the load to the systems). Therefore, the negative-phase current cannot be apparently flowed through impedance 3 shown in FIG. 1, and the unbalanced voltage of bus 6 caused thereby can be removed. Note that since distributor 420A shown in FIG. 4 includes amplifiers 451U, 451V, and 451W each comprising a proportional integrator, the compensation operation can be executed until the negative-phase voltage of the systems can be completely reduced to zero.

When a reactive current flows through the system to change the system voltage, this is detected by control circuit 350 (signal P1PD shown in FIG. 4), and the current of reactor part 300 is adjusted based on the comparison result between the detected voltage and voltage setting value EREF*. For example, if the voltage of the systems is decreased, the reactor current is reduced. Thus, as can be seen from the description of FIG. 2, the phase of a current (IR) generated from reactive power compensation apparatus 100 is advanced, the voltage of system bus 6 is increased (i.e., when a phase-advanced current is flowed through inductance 3, the voltage of bus 6 is increased), and the bus voltage is maintained at the set value. When the voltage of bus 6 is increased, reactive power compensation apparatus 100 generates a delayed current (IR) to decrease the voltage of system bus 6, and hence, the voltage of system bus 6 is maintained at a set value (EREF*).

As can be seen from the above description, in the power supply system comprising the reactive power compensation apparatus according to the present invention, if a voltage fluctuation is caused by reactive power fluctuation in the load, or if a voltage unbalance is caused by a negative-phase current, they can be compensated for by the reactive power compensation apparatus. Therefore, a high-quality power with less voltage fluctuation and a balanced voltage can be supplied.

The typical embodiment of the present invention has been described above.

As the invention related to the present invention, there is U.S. Pat. No. 4,698,581, issued Oct. 6, 1987, corresponding to Japanese patent application Nos. 60-200010 and 60-200012. All the disclosures of U.S. Pat. No. 4,698,581 are incorporated in the present application.

The invention of U.S. Pat. No. 4,698,581 can be applied only to a specific reactive power compensation control directed to a specific load such as an arc furnace equipped for a factory. In such an application, the configuration of a power system has to be simple, and the direction of a current-flow of the power system must be actually specified so as to be able to detect the current. More specifically, in that application, a power source and a load, mutually connected to each other via a power system, must be clearly distinguished in the compensation control.

In addition, the invention of U.S. Pat. No. 4,698,581 depends on a current detection to achieve the reactive power compensation control. For this reason, if the voltage of the power system is increased or decreased continuously, this control cannot compensate for the voltage increase or decrease, so that no constant voltage is obtained for the power system.

In contrast, the present invention can be applied to a reactive power compensation control generally directed to various loads such as power transmission systems. In such an application, the configuration of a power system may be complex, and the direction of a current-flow of the power system may not be actually specified so as to disable the current detection. In other words, in that application, a power source and a load, mutually connected to each other via a power system, may be undefined.

In addition, the present invention depends on a voltage detection, not on a current detection, to achieve the reaction power compensation control. For this reason, the compensation control serves to provide a controlled voltage source. Consequently, even if the voltage of the power system is increased or decreased, the control can compensate for the voltage increase or decrease so that a constant voltage is obtained for the power system.

As mentioned above, the present invention materially differs from the invention of U.S. Pat. No. 4,698,581 with respect to the application, the manner of practicing, and the effect. Which invention (the present invention or the invention of the U.S. patent) should be used depends on the target of the compensation control.

Note that dual phase generator 406 shown in FIG. 3 can be arranged the same as that in FIG. 7 of U.S. Pat. No. 4,698,581. In this case, cos $\theta 1d1^*$ and $-\sin\theta 1d1^*$ in FIG. 7 of the U.S. patent replace e1d* and e1q* in FIG. 3 of the present invention.

Figure 5:
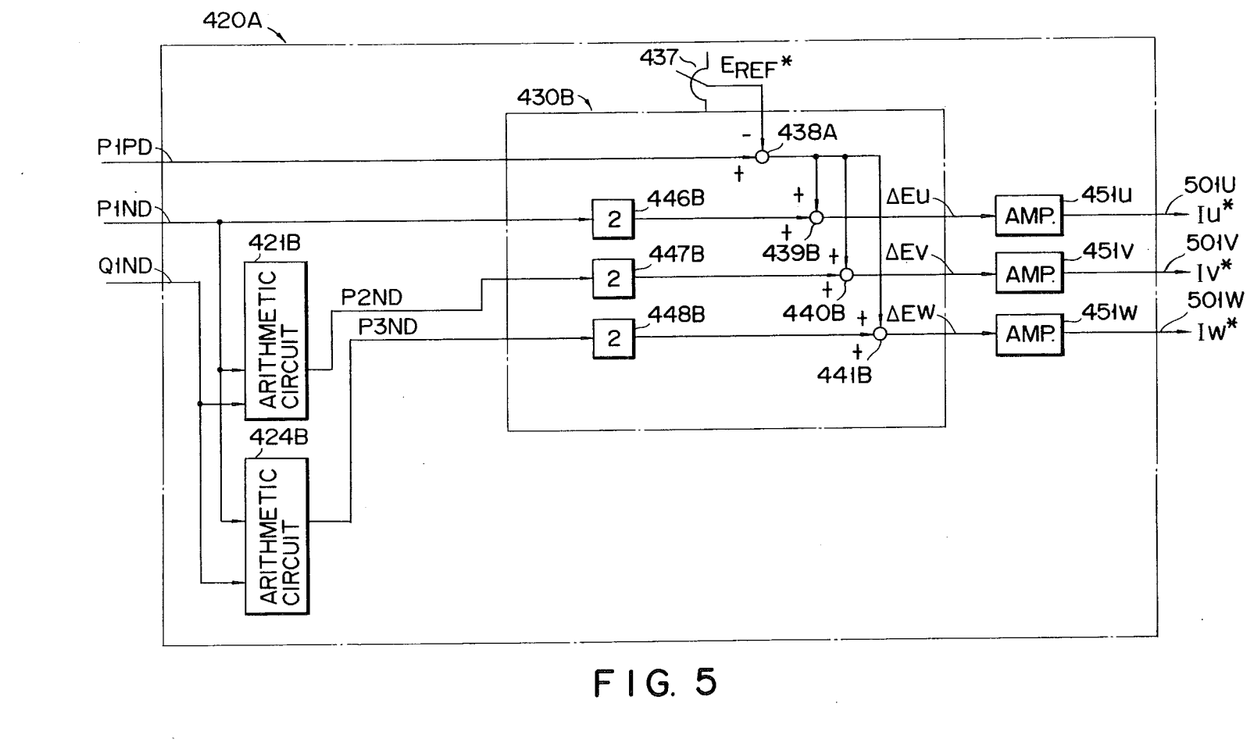
FIG. 5 is a block diagram showing another arrangement of the distributor (420A) in the control circuit shown in FIG. 3.

Another embodiment of the present invention will now be described with reference to FIG. 5. FIG. 5 shows a modification of distributor 420A shown in FIG. 5 according to the present invention. The circuit shown in FIG. 5 is inserted in distributor 420A shown in FIG. 3. Therefore, most of this modification encompasses the above embodiment of the present invention, and a description of the identical portions will be omitted. The portions indicated by the identical symbols in FIGS. 5 and 3 are connected according to the symbols.

Referring to FIG. 5, arithmetic circuits 421B and 424B receive first-phase 90-degree-out-of-phase negative-phase voltage signal Q1ND and first-phase in-phase negative-phase current signal P1ND described above, and output second-phase in-phase negative-phase voltage signal P2ND and third-phase in-phase negative-phase P3ND through the arithmetic operations represented by equations (8) and (9) as follows:

$$P2ND = P1ND \cdot \cos(2\pi/3) - Q1ND \cdot \sin(2\pi/3) \quad (8)$$

$$P3ND = P1ND \cdot \cos(2\pi/3) + Q1ND \cdot \sin(2\pi/3) \quad (9)$$

P2ND and P3ND are the same as signals P2ND and P3ND obtained from equations (5) and (6) in the above embodiment.

Setting device 437 outputs voltage setting signal EREF*. Distributor 430B receives positive-phase fundamental wave voltage signal P1PD, first-, second-, and third-phase in-phase negative-phase voltage signals P1ND, P2ND, and P3ND, and voltage setting signal EREF*, and performs the arithmetic operations represented by equations (10) based on these signals, thereby outputting voltage deviation signals $\Delta EU$, $\Delta EV$, and $\Delta EW$:

$$\begin{aligned} \Delta EU &= (-EREF^* + P1PD) + 2 \cdot P1ND \\ \Delta EV &= (-EREF^* + P1PD) + 2 \cdot P2ND \\ \Delta EW &= (-EREF^* + P1PD) + 2 \cdot P3ND \end{aligned} \quad (10)$$

Amplifiers 451U, 451V, and 451W comprising proportional integrators respectively amplify deviation signals $\Delta EU$, $\Delta EV$, and $\Delta EW$ and output first-, second-, and third-phase current instructions IU*, IV*, and IW*. Note that coefficient multipliers 446B, 447B, and 448B respectively multiply the input signals by 2 and output the obtained results. Adders 438A, 439B, 440B, and 441B add the signals shown in FIG. 5 in the polarities shown therein.

Current instructions IU*, IV*, and IW* are quite similar to those obtained in FIG. 4. Therefore, when the current of reactor part 300 shown in FIG. 1 is controlled based on instructions IU*, IV*, and IW*, the same compensation effect as that in the embodiment shown in FIGS. 3 and 4 can be obtained.

In this modification, the arithmetic operations in arithmetic circuits 421B and 424B shown in FIG. 5 can be simpler than those in arithmetic circuits 421A and 424A shown in FIG. 4.

Figure 6:
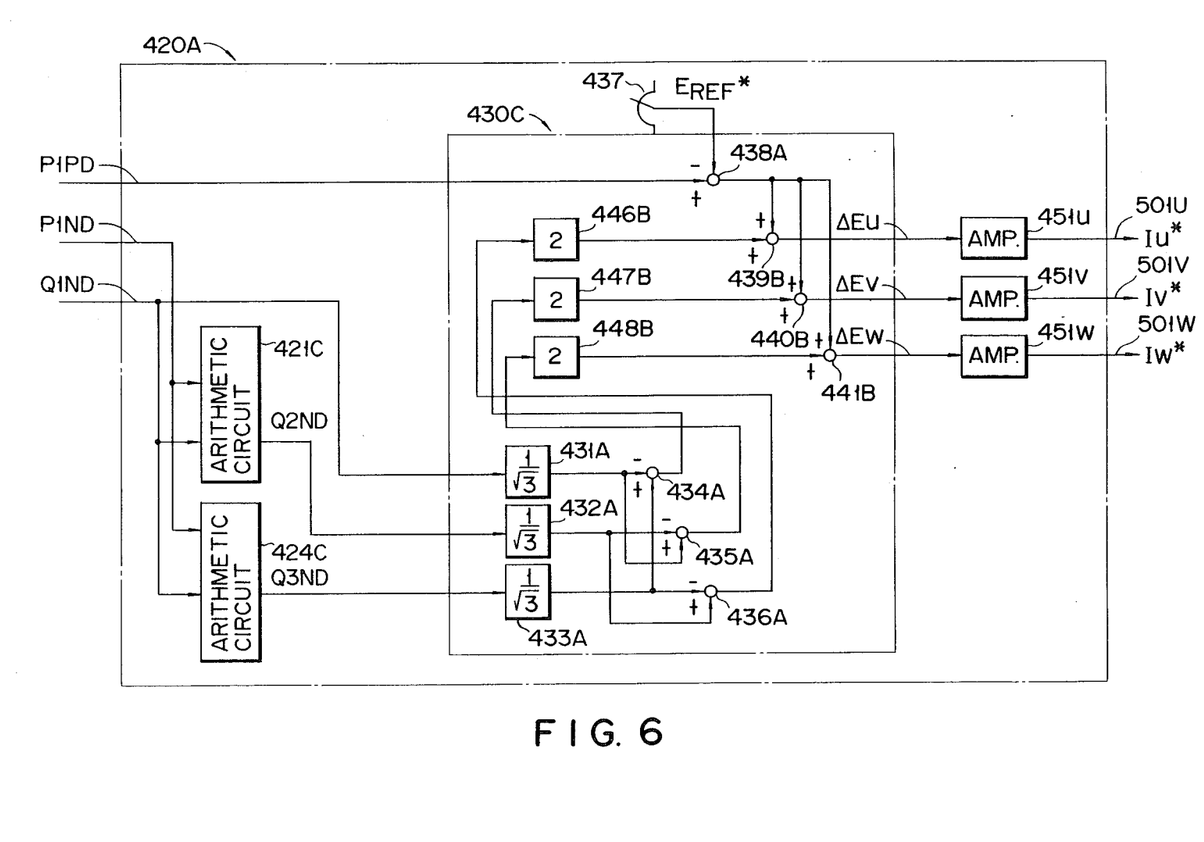
FIG. 6 is a block diagram showing still another arrangement of the distributor (420A) in the control circuit shown in FIG. 3.

Still another embodiment of the present invention will now be described with reference to FIG. 6. This embodiment is also associated with a modification of FIG. 4, and the circuit shown in FIG. 6 is inserted in distributor 420A shown in FIG. 3. Therefore, a description of the portions identical to those in the above embodiments will be omitted.

Referring to FIG. 6, arithmetic circuits 421C and 424C receive first-phase 90-degree-out-of-phase negative-phase voltage signal Q1ND and first-phase in-phase negative-phase current signal P1ND described above, and output second-phase 90-degree-out-of-phase negative-phase voltage signal Q2ND and third-phase 90-degree-out-of-phase negative-phase Q3ND through the arithmetic operations represented by equations (11) and (12). Q2ND and Q3ND are the same as signals Q2ND and Q3ND obtained from equations (5) and (6) in the above embodiment.

$$Q2ND = P1ND \cdot \sin(2\pi/3) + Q1ND \cdot \cos(2\pi/3) \quad (11)$$

$$Q3ND = -P1ND \cdot \sin(2\pi/3) + Q1ND \cdot \cos(2\pi/3) \quad (12)$$

Setting device 437 outputs voltage setting signal EREF*. Distributor 430C receives positive-phase fundamental wave voltage signal P1PD, first-, second-, and third-phase 90-degree-out-of-phase negative-phase voltage signals Q1ND, Q2ND, and Q3ND, and voltage setting signal EREF*, and performs the arithmetic operations represented by equations (13) based on these signals, thereby outputting voltage deviation signals ΔEU, ΔEV, and ΔEW:

$$\begin{aligned}
\Delta EU &= (-EREF^* + P1PD) + \\
&\quad (2/\sqrt{3})(Q2ND - Q3ND) \\
\Delta EV &= (-EREF^* + P1PD) + \\
&\quad (2/\sqrt{3})(Q3ND - Q1ND) \\
\Delta EW &= (-EREF^* + P1PD) + \\
&\quad (2/\sqrt{3})(Q1ND - Q2ND)
\end{aligned} \quad (13)$$

Amplifiers 451U, 451V, and 451W, comprising proportional integrators, respectively amplify deviation signals ΔEU, ΔEV, and ΔEW and output first-, second-, and third-phase current instructions IU*, IV*, and IW*. Note that coefficient multipliers 431A, 432A, and 433A respectively multiply the input signals by $(1\sqrt{3})$, and output the products. Coefficient multipliers 446B, 447B, and 448B respectively multiply the input signals by 2 and output the products. Furthermore, adders 438A, 439B, 440B, 441B, 434A, 435A, and 436A respectively add the signals shown in FIG. 6 in the corresponding polarities shown therein.

Current instructions IU*, IV*, and IW* are the same as those obtained in FIG. 4. Therefore, when the current of reactor part 300 shown in FIG. 1 is controlled based on instructions IU*, IV*, and IW*, the same compensation effect as that in the embodiment shown in FIGS. 3 and 4 can be obtained.

In this modification, the arithmetic operations in arithmetic circuits 421C and 424C shown in FIG. 6 can be simpler than those in arithmetic circuits 421A and 424A shown in FIG. 4.

Another embodiment of the present invention will now be described with reference to FIG. 7.

Figure 7:
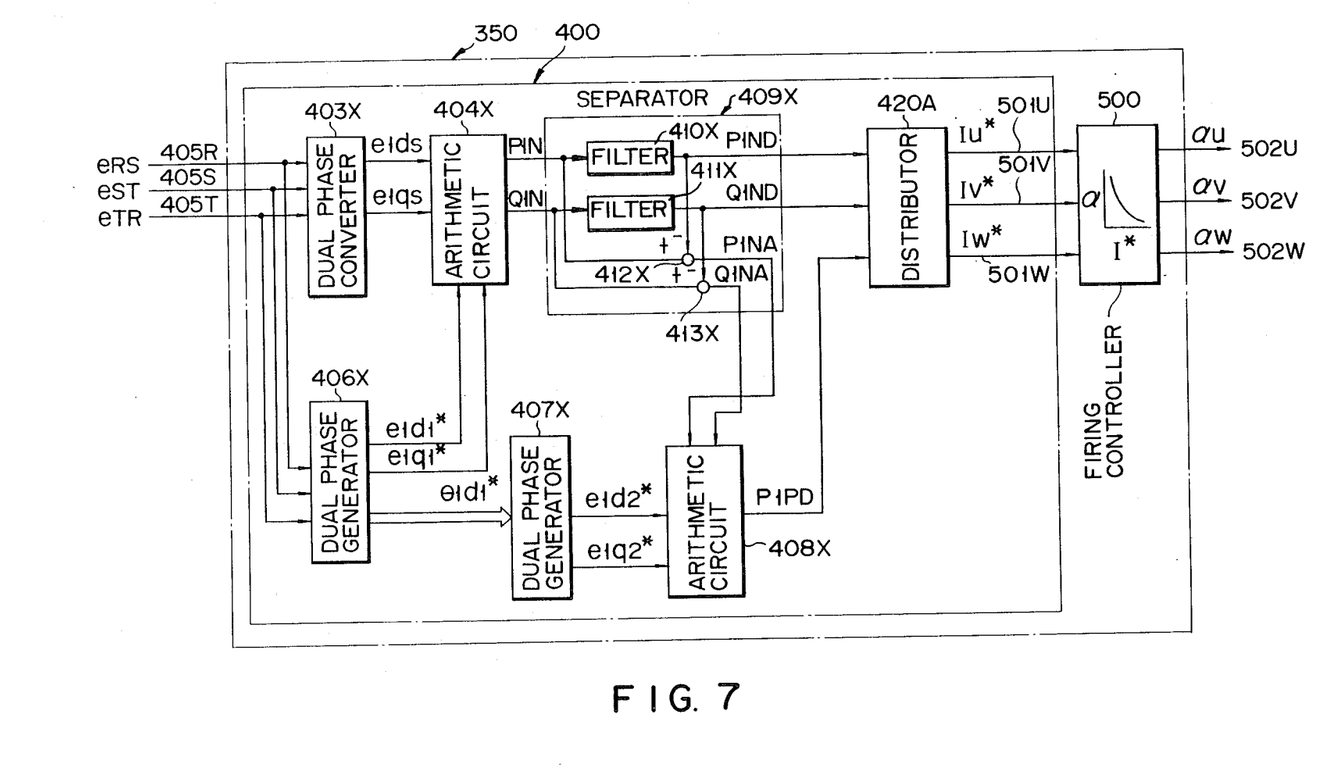
FIG. 7 is a block diagram showing a control circuit of a reactive power compensation apparatus according to another embodiment of the present invention.

Referring to FIG. 7, AC bus voltage signals eRS, eST, and eTR shown in FIG. 1 are input to dual phase converter 403X and dual phase signal generator 406X. Dual phase converter 403X converts voltage signals eRS, eST, and eTR into dual-phase voltage signal e1ds and e1qs through the arithmetic operations shown in equations (1) given above. Dual phase signal generator 406X comprises a phase-locked loop circuit. Generator 406X receives voltage signals eRS, eST, and eTR, and outputs unit-sine signal e1d1* synchronous with line voltage eRS across the first and second phases, unit-sine signal e1q1* advanced from signal e1d1* by 90 degrees, and its phase signal θ1d1* if the first phase shown in FIG. 1 is referred to as an R phase; the second phase, an S phase, and the third phase, a T phase. Signals e1d1* and e1q1* can be represented by equations (14) below. (The detailed arrangement of generator 406X can be the same as that shown in FIG. 7 of the above-mentioned U.S. patent application No. 903,957.)

$$\left.\begin{aligned} e1d1^* &= \cos\theta 1d1^* \\ e1q1^* &= -\sin\theta 1d1^* \end{aligned}\right\} \quad (14)$$

Dual phase generator 407X is operated in response to phase angle signal θ1d1* and generates dual phase voltage signals e1d2* and e1q2* each having a frequency twice the AC bus voltage frequency and represented by equations (15):

$$\left.\begin{aligned} e1d2^* &= \cos 2\theta 1d1^* \\ e1q2^* &= \sin 2\theta 1d1^* \end{aligned}\right\} \quad (15)$$

Arithmetic circuit 404X receives signals e1ds and e1qs and signals e1d1* and e1q1*, and yields signals Q1N and P1N through equations (16):

$$\left.\begin{aligned} Q1N &= e1d1^* \cdot e1qs - e1q1^* \cdot e1ds \\ P1N &= e1d1^* \cdot e1ds + e1q1^* \cdot e1qs \end{aligned}\right\} \quad (16)$$

When system voltages eRS, eST, and eTR include positive-/negative-phase components, Q1N and P1N are pulse currents including DC and AC components which are oscillated at a frequency twice that of the fundamental wave.

Separator 409X comprises DC filters 410X and 411X and adders 412X and 413X. Separator 409X receives signals P1N and Q1N. The DC components are detected by DC filters 410X and 411X, and the detected components are output as signals P1ND and Q1ND. Separator 409x removes the DC components, i.e., P1ND and Q1ND from signals P1N and Q1N by adders 412X and 413X, and outputs only the AC components as signals P1NA and Q1NA. Signals P1ND and Q1ND obtained as described above respectively represent voltages of respective components when the negative-phase voltage component included in line voltage eRS across the first and second phases is separated into a component (P1ND) in phase with a positive-phase fundamental wave voltage of the line voltage across the first and second phases and a component (Q1ND) having a 90-degree phase difference therefrom. Note that hereinafter, when P1ND is referred to, it will relate to a first-phase in-phase negative-phase voltage signal, and Q1ND will relate to a first-phase 90-degree-out-of-phase negative-phase voltage signal.

Arithmetic circuit 408X receives signals P1NA and Q1NA, and signals e1d2* and e1q2*, and calculates signal P1PD in accordance with equation (17):

$$P1PD = e1d2^* \cdot P1NA + e1q2^* \cdot Q1NA \quad (17)$$

Signal P1PD is a DC signal, and represents the positive-phase fundamental wave voltage included in system voltages eRS, eST, and eTR.

Distributor 420A performs the arithmetic operations upon reception of signals P1PD, P1ND, and Q1ND, and outputs current instructions IU*, IV*, and IW* for instructing a current to be flowed from reactor part 300 shown in FIG. 1. The arrangement of distributor 420A can be any of FIGS. 4 to 6.

Firing controller 500 is operated upon reception of current instructions IU*, IV*, and IW*, and firing-controls thyristors 301U, 301V, and 301W so that reactor part 300 supplies the currents (fundamental wave) instructed by instructions IU*, IV*, and IW*. The following operation of FIG. 7 is the same as that in FIG. 3.

As can be seen from the above description, the reactive power compensation apparatus of the present invention can provide the following effects.

(1) When a fluctuating or unbalanced load is connected to an AC power supply system, voltage fluctuation and voltage unbalance of the AC bus provide problems. However, according to the present invention, whether these fluctuations are caused by positive- or negative-phase components can be clearly differentiated. Therefore, an object to be compensated of the reactive power compensation circuit can be identified. As a result, control with respect to only the voltage fluctuation of the system (voltage fluctuation control), control with respect to only the unbalanced voltage of the system (voltage balance control), control with respect to both the objects to be controlled, and the like can be desirably achieved, and high-precision voltage compensation control can be easily realized as compared to the conventional apparatus.

(2) The positive- and negative-phase components of the system voltages can be continuously detected in the form of DC signals, and hence, the control experiences no discontinuity, thereby realizing stable control.

(3) In the control circuit, when the positive- and negative-phase components of the voltage are to be detected, simple elements such as coefficient multipliers, adders, multipliers, and the like are adopted as a signal processing means, and desired signals can be obtained through simple arithmetic operations. Therefore, the detection signals include no variations, and accurate high-precision signals (associated with positive- and negative-phase components) can be obtained. Since the circuit is simple, the cost can also be reduced.

According to the reactive power compensation apparatus of the present invention as described above, since a novel control concept that "positive- and negative-phase components are separately detected and compensation control is made based on these detection results" is employed, complicated and high-precision reactive power compensation control can be performed.

What is claimed is:

1. A reactive power compensation apparatus for compensating for voltage fluctuation of an AC power supply system, comprising:
   first arithmetic means for synthesizing a positive-phase fundamental wave voltage signal from voltages of the AC power supply system;
   second arithmetic means for synthesizing negative-phase voltage signals from the voltages of the AC power supply system;
   third arithmetic means, coupled to said first and second arithmetic means, for synthesizing current instructions from the positive-phase fundamental wave voltage and the negative-phase voltage signals; and
   means, coupled to said third arithmetic means, for generating a reactive power corresponding to the current instructions.

2. A reactive power compensation apparatus for compensating for voltage fluctuation of an AC power supply system, comprising:
   first conversion means for converting voltages of the AC power supply system into dual phase voltage signals;
   second conversion means for converting the voltages of the AC power supply system into unit-dual-phase voltage signals;
   first synthesizing means, coupled to said first and second conversion means, for synthesizing a positive-phase fundamental wave voltage signal from the dual phase voltage signals and the unit-dual-phase voltage signals;
   second synthesizing means, coupled to said first and second conversion means, for synthesizing negative-phase voltage signals from the dual phase voltage signals and the unit-dual-phase voltage signals;
   third synthesizing means, coupled to said first and second synthesizing means, for synthesizing current instructions from the positive-phase fundamental wave voltage signal and the negative-phase voltage signals; and
   means, coupled to said third synthesizing means, for supplying a reactive power corresponding to the current instructions to the AC power supply system.

3. A reactive power compensation apparatus for compensating for an unbalanced voltage and voltage fluctuation of a multi-phase AC power supply system, comprising:
   first means for, if N is an integer not less than 2, generating, from multi-phase voltages of the N-phase multi-phase AC power supply system, unit-sine signal e1d*, synchronous with a first-phase voltage, and unit-sine signal e1q*, whose phase is delayed by substantially 90 degrees from unit-sine signal e1d*;
   second means for generating dual phase voltage signal e1ds and dual phase voltage signal e1qs from the multi-phase voltages by dual-phase conversion which has d and q axes and in which the d axis is in-phase with the first-phase voltage;
   third means for generating signals P1P, P1N, and Q1N from unit-sine signals e1d*, e1q* and dual phase voltage signals e1ds and e1qs in accordance with the following arithmetic operations:

$$P1P = e1d^* \cdot e1ds + e1q^* \cdot e1qs$$

$$P1N = e1d^* \cdot e1ds - e1q^* \cdot e1qs$$

$$Q1N = e1d^* \cdot e1qs + e1q^* \cdot e1ds$$

fourth means for generating signal P1PD corresponding to a detected DC component of signal P1P;
   fifth means for generating signals P1ND and Q1ND corresponding to detected DC components of signals P1N and Q1N; and
   sixth means for generating first- to Nth-phase current instructions of the N-phase multi-phase AC power supply system from signals P1PD, P1ND, and Q1ND,
   wherein said reactive power compensation apparatus compensates for the unbalanced voltage and the voltage fluctuation of the multi-phase AC power supply system based on the first- to Nth-phase current instructions.

4. An apparatus according to claim 3, wherein said sixth means includes:

setting signal generating means for generating system voltage setting signal EREF* for setting the voltage of the AC power supply system to be maintained by the operation of said reactive power compensation apparatus;

first arithmetic means for generating signals P2ND, Q2ND, P3ND, and Q3ND from signals P1ND and Q1ND using the following arithmetic operations:

$$P2ND = P1ND \cdot \cos(2\pi/3) - Q1ND \cdot \sin(2\pi/3)$$

$$Q2ND = P1ND \cdot \sin(2\pi/3) + Q1ND \cdot \cos(2\pi/3)$$

$$P3ND = P1ND \cdot \cos(2\pi/3) + Q1ND \cdot \sin(2\pi/3)$$

$$Q3ND = -P1ND \cdot \sin(2\pi/3) + Q1ND \cdot \cos(2\pi/3)$$

second arithmetic means for generating voltage deviation signals $\Delta EU$, $\Delta EV$, and $\Delta EW$ from signals EREF*, P1PD, Q1ND, Q2ND, Q3ND, P1ND, P2ND and P3ND through the following arithmetic operations:

$$\Delta EU = -EREF^* + P1PD + P1ND + (Q2ND - Q3ND)/\sqrt{3}$$

$$\Delta EV = -EREF^* + P1PD + P2ND + (Q3ND - Q1ND)/\sqrt{3}$$

$$\Delta EW = -EREF^* + P1PD + P3ND + (Q1ND - Q2ND)/\sqrt{3}$$

and current instruction means for amplifying voltage deviation signals $\Delta EU$, $\Delta EV$, and $\Delta EW$ and generating current instructions IU*, IV*, and IW* corresponding to the voltage deviation signals.

5. An apparatus according to claim 3, wherein said sixth means includes:

setting signal generating means for generating system voltage setting signal EREF* for setting the voltage of the AC power supply system to be maintained by the operation of said reactive power compensation apparatus;

first arithmetic means for generating signals P2ND and P3ND from signals P1ND and Q1ND using the following arithmetic operations:

$$P2ND = P1ND \cdot \cos(2\pi/3) - Q1ND \cdot \sin(2\pi/3)$$

$$P3ND = P1ND \cdot \cos(2\pi/3) + Q1ND \cdot \sin(2\pi/3)$$

second arithmetic means for generating voltage deviation signals $\Delta EU$, $\Delta EV$, and $\Delta EW$ from signals EREF*, P1PD, P1ND, P2ND, and P3ND through the following arithmetic operations:

$$\Delta EU = -EREF^* + P1PD + 2 \cdot P1ND$$

$$\Delta EV = -EREF^* + P1PD + 2 \cdot P2ND$$

$$\Delta EW = -EREF^* + P1PD + 2 \cdot P3ND$$

and current instruction means for amplifying voltage deviation signals $\Delta EU$, $\Delta EV$, and $\Delta EW$ and generating current instructions IU*, IV*, and IW* corresponding to the voltage deviation signals.

6. An apparatus according to claim 3, wherein said sixth means includes:

setting signal generating means for generating system voltage setting signal EREF* for setting the voltage of the AC power supply system to be maintained by the operation of said reactive power compensation apparatus;

first arithmetic means for generating signals Q2ND and Q3ND from signals P1ND and Q1ND using the following arithmetic operations:

$$Q2ND = P1ND \cdot \sin(2\pi/3) + Q1ND \cdot \cos(2\pi/3)$$

$$Q3ND = -P1ND \cdot \sin(2\pi/3) + Q1ND \cdot \cos(2\pi/3)$$

second arithmetic means for generating voltage deviation signals $\Delta EU$, $\Delta EV$, and $\Delta EW$ from signals EREF*, P1PD, Q1ND, Q2ND, and Q3ND through the following arithmetic operations:

$$\Delta EU = -EREF^* + P1PD + 2 \cdot (Q2ND - Q3ND)/\sqrt{3}$$

$$\Delta EV = -EREF^* + P1PD + 2 \cdot (Q3ND - Q1ND)/\sqrt{3}$$

$$\Delta EW = -EREF^* + P1PD + 2 \cdot (Q1ND - Q2ND)/\sqrt{3}$$

and current instruction means for amplifying voltage deviation signals $\Delta EU$, $\Delta EV$, and $\Delta EW$ and generating current instructions IU*, IV*, and IW* corresponding to the voltage deviation signals.

7. A reactive power compensation apparatus for compensating for an unbalanced voltage and voltage fluctuation of a multi-phase AC power supply system comprising:

first means for, if N is an integer not less than 2, generating, from multi-phase voltages of the N-phase multi-phase AC power supply system, unit-sine signal e1d1* which changes synchronously with a first-phase voltage, unit-sine signal e1q1* whose phase is advanced by substantially 90 degrees from unit-sine signal e1d1*, and phase angle signal $\theta1d1^*$ indicating a phase of unit-sine signal e1d1*;

second means for generating dual phase voltage signal e1ds and dual phase voltage signal e1qs from the multi-phase voltages by dual-phase conversion which has d and q axes and in which the d axis is in-phase with the first-phase voltage;

third means for generating signals P1N and Q1N from unit-sine signals e1d1* and e1q1* and dual phase voltage signals e1ds and e1qs in accordance with the following arithmetic operations:

$$P1N = e1d1^* \cdot e1ds + e1q1^* \cdot e1qs$$

$$Q1N = e1d1^* \cdot e1qs - e1q1^* \cdot e1ds$$

fourth means for generating signals P1PD and Q1ND corresponding to detected DC components of signals P1N and Q1N;

fifth means for generating signals P1NA and Q1NA corresponding to detected AC components of signals P1N and Q1N;

sixth means for generating, based on phase angle signal $\theta1d1^*$, unit-sine wave signal e1d2* which changes at phase angle $2 \cdot \theta1d1^*$ and unit-sine signal e1q2* whose phase is delayed by substantially 90 degrees from unit-sine signal e1d2*;

seventh means for generating signal P1PD based on unit-sine signals e1d2* and e1q2* and AC component detection signals P1NA and Q1NA through the following arithmetic operation:

$$P1PD = e1d2^* \cdot P1NA + e1q2^* \cdot Q1NA$$

and eighth means for generating first- to Nth-phase current instructions for the N-phase multi-phase AC power supply system from signals P1PD, P1ND, and Q1ND, wherein said reactive power compensation apparatus compensates for the unbalanced voltage and the voltage fluctuation of the multi-phase AC power supply system based on the first- to Nth-phase current instructions.

8. An apparatus according to claim 7, wherien said eighth means includes:

setting signal generating means for generating system voltage setting signal EREF* for setting the voltage of the AC power supply system to be maintained by the operation of said reactive power compensation apparatus;

first arithmetic means for generating signals P2ND, Q2ND, P3ND, and Q3ND from signals P1ND and Q1ND using the following arithmetic operations:

$$P2ND = P1ND \cdot \cos(2\pi/3) - Q1ND \cdot \sin(2\pi/3)$$

$$Q2ND = P1ND \cdot \sin(2\pi/3) + Q1ND \cdot \cos(2\pi/3)$$

$$P3ND = P1ND \cdot \cos(2\pi/3) + Q1ND \cdot \sin(2\pi/3)$$

$$Q3ND = -P1ND \cdot \sin(2\pi/3) + Q1ND \cdot \cos(2\pi/3)$$

second arithmetic means for generating voltage deviation signals $\Delta EU$, $\Delta EV$, and $\Delta EW$ from signals EREF*, P1PD, Q1ND, Q2ND, Q3ND, P1ND, P2ND and P3ND through the following arithmetic operations:

$$\Delta EU = -EREF^* + P1PD + P1ND + (Q2ND - Q3ND)/\sqrt{3}$$

$$\Delta EV = -EREF^* + P1PD + P2ND + (Q3ND - Q1ND)/\sqrt{3}$$

$$\Delta EW = -EREF^* + P1PD + P3ND + (Q1ND - Q2ND)/\sqrt{3}$$

and current instruction means for amplifying voltage deviation signals $\Delta EU$, $\Delta EV$, and $\Delta EW$ and generating current instructions IU*, IV*, and IW* corresponding to the voltage deviation signals.

9. An apparatus according to claim 7, wherein said eighth means includes:

setting signal generating means for generating system voltage setting signal EREF* for setting the voltage of the AC power supply system to be maintained by the operation of said reactive power compensation apparatus;

first arithmetic means for generating signals P2ND and P3ND from signals P1ND and Q1ND using the following arithmetic operations:

$$P2ND = P1ND \cdot \cos(2\pi/3) - Q1ND \cdot \sin(2\pi/3)$$

$$P3ND = P1ND \cdot \cos(2\pi/3) + Q1ND \cdot \sin(2\pi/3)$$

second arithmetic means for generating voltage deviation signals $\Delta EU$, $\Delta EV$, and $\Delta EW$ from signals EREF*, P1PD, P1ND, P2ND, and P3ND through the following arithmetic operations:

$$\Delta EU = -EREF^* + P1PD + 2 \cdot P1ND$$

$$\Delta EV = -EREF^* + P1PD + 2 \cdot P2ND$$

$$\Delta EW = -EREF^* + P1PD + 2 \cdot P3ND$$

and current instruction means for amplifying voltage deviation signals $\Delta EU$, $\Delta EV$, and $\Delta EW$ and generating current instructions IU*, IV*, and IW* corresponding to the voltage deviation signals.

10. An apparatus according to claim 7, wherein said eighth means includes:

setting signal generating means for generating system voltage setting signal EREF* for setting the voltage of the AC power supply system to be maintained by the operation of said reactive power compensation apparatus;

first arithmetic means for generating signals Q2ND and Q3ND from signals P1ND and Q1ND using the following arithmetic operations:

$$Q2ND = P1ND \cdot \sin(2\pi/3) + Q1ND \cdot \cos(2\pi/3)$$

$$Q3ND = -P1ND \cdot \sin(2\pi/3) + Q1ND \cdot \cos(2\pi/3)$$

second arithmetic means for generating voltage deviation signals $\Delta EU$, $\Delta EV$, and $\Delta EW$ from signals EREF*, P1PD, Q1ND, Q2ND, and Q3ND through the following arithmetic operations:

$$\Delta EU = -EREF^* + P1PD + 2 \cdot (Q2ND - Q3ND)/\sqrt{3}$$

$$\Delta EV = -EREF^* + P1PD + 2 \cdot (Q3ND - Q1ND)/\sqrt{3}$$

$$\Delta EW = -EREF^* + P1PD + 2 \cdot (Q1ND - Q2ND)/\sqrt{3}$$

and current instruction means for amplifying voltage deviation signals $\Delta EU$, $\Delta EV$, and $\Delta EW$ and generating current instructions IU*, IV*, and IW* corresponding to the voltage deviation signals.

* * * * *